Figure 1:
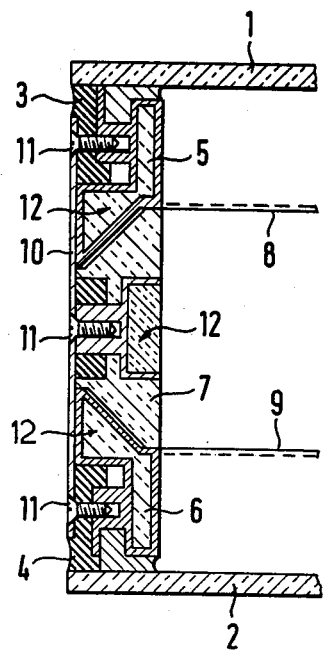

United States Patent [19]

Weinlich

[11] 4,242,386
[45] Dec. 30, 1980

[54] MULTIPLE GLAZING UNITS

[75] Inventor: Tilman L. Weinlich, Samerberg, Fed. Rep. of Germany

[73] Assignee: Christel Konrad, Samerberg, Fed. Rep. of Germany

[21] Appl. No.: 964,390

[22] Filed: Nov. 28, 1978

[51] Int. Cl.³ .................. B05D 5/00; B32B 17/10
[52] U.S. Cl. .................... 428/34; 156/109;
156/229; 252/62; 428/38; 428/228; 428/251;
428/268; 428/429; 428/913; 428/920
[58] Field of Search ............ 428/34, 38, 429, 913,
428/920, 228, 251, 268; 252/62; 156/99, 109,
229

[56] References Cited

U.S. PATENT DOCUMENTS

| 2,303,125 | 11/1942 | Knight | 428/34 X |
|---|---|---|---|
| 2,625,717 | 1/1953 | Wampler | 428/34 |
| 2,750,637 | 6/1956 | Browne | 428/34 |
| 3,457,138 | 7/1969 | Miller et al. | 428/34 |
| 3,460,981 | 8/1969 | Keil et al. | 428/429 |
| 3,473,988 | 10/1969 | Rullier et al. | 428/34 X |
| 3,573,149 | 3/1971 | Tibble et al. | 428/34 X |
| 3,630,814 | 12/1971 | Arnold | 428/34 |
| 4,144,684 | 3/1979 | Kirkbride et al. | 428/34 X |
| 4,149,348 | 4/1979 | Pyzewski | 428/34 X |
| 4,151,690 | 5/1979 | Schoofs | 428/34 X |
| 4,158,278 | 6/1979 | Cardinale et al. | 428/34 X |
| 4,173,668 | 11/1979 | Hentzelt | 428/34 |
| 4,188,425 | 2/1980 | Hanstein et al. | 428/34 |
| 4,190,698 | 2/1980 | Boel et al. | 428/920 X |

Primary Examiner—Harold Ansher

[57] ABSTRACT

A hermetically sealed multiple glazing unit comprises at least one film located between spaced parallel glass panes which are attached to spacing and sealing means constituted by frame portions. The films are attached to the outer frame portions and are stretched when these frame portions are pressed against an intermediate frame portion, by virtue of the profiled confronting surfaces on the frame portions. In another embodiment of the present invention, the multiple glazing unit is not hermetically sealed, and the space between the outer pane and the outermost film is vented through a filter. A silicone coating may be applied to the inner surfaces of the panes and/or to the films to inhibit condensation onto the light-transmitting surfaces. An ultraviolet radiation blocking layer can be provided to protect the film from degradation.

26 Claims, 5 Drawing Figures

MULTIPLE GLAZING UNITS

DESCRIPTION

The invention relates to multiple glazing units and to a method of manufacturing same. The present invention relates particularly to methods of stretching films disposed between panes in multiple glazing units, which units may be suitable as thermal insulating units and/or soundproofing units, and as covers for collector plates for low-temperature solar collectors, etc.

Double glazing units and insulating glazing units whose edges or frames are hermetically sealed, and double glazing units and insulating glazing units with water vapour inhibiting sealing and with desiccants in the edge region are known (for example, in U. Reitmayer, "Holzfenster in handwerkliche Konstruktion" [Manually constructed wooden windows] Stuttgart, 1956, pages 56 to 59). Furthermore, in double glazing units, it is known to avoid misting of the inner surface of the panes by connecting the interior space of the unit to the outer atmosphere so as to permit the passage of water vapour, and either the air being circulated, or the vapour pressure being equalized by diffusion. Valves for the equalization of the vapour pressure and/or dust filters are used which are fitted in the frames (see German Patent Specification No. 376,211 and German Patent Specification No. 504 560). In addition to serving for the circulation of air to avoid deposits of condensate, the openings provide in the last-mentioned patent specification also serve for introducing a cleaning implement which, for example, can remove dust.

Furthermore, it is known to use one or a plurality of plastic panes in multiple glazing units (see German Patent Specification No. 638 327), or to use coatings which are reflective in the infrared range (see German Patent Specification No. 689 524; German Utility Model No. 16 95 387 and German Patent Specification No. 1 079 291). It is also known to seal the space between the panes in an air-tight manner and to fill it with a gas which is denser than air in order to reduce the thermal conduction.

It is known from H. Leuder "Energiehanshalt im Hochbau" (Energy Economy in Building Construction) Zurich 1976, page 57, to stretch several highly transparent films which are located between the panes. Furthermore, it has already been proposed to dispose a vapour-deposited film between two panes, and to fill the cavities between the panes with a gas (see German Offenlegungsschrift No. 2 263 353), or to stretch one or several films between vapour-deposited films (see German Offenlegungsschrift No. 2 443 390). In some cases, the inside surfaces of the panes and/or the films have been coated with a silicone-based material so that, if the spacing and sealing means between the panes should become defective, the condensate is deposited on the spacers and not on the surfaces of the glass or the films.

By way of example, the following measures have been proposed for soundproofing in connection with the glazing: thick panes, several panes of differing thicknesses, filling with light or dense gases, increasing the distance between the panes, sound-absorbing materials in the spacer or on the spacer (see Gösele/Schüle) "Schall, Wärme, Feuchtigkert" (Sound, heat, moisture), Berlin-Weisbaden, 1977, pages 80 and 81), avoiding the transmission of sound across the spacer by damping in the juncture region between the spacer and the glass and in the spacer (see German Offenlegungsschrift No. 2 445 332), and combinations of these measures.

The known double glazing units and insulating glazing units result in a relatively small advantage with respect to the small k-value, that is to say, the standard measure of the heat-insulating properties of glazing or the heat transmission value, when such improvements are related to the additional costs. The glazing unit is reduced relatively complicated and is thus expensive when several measures are undertaken in order to improve the glazing unit. The manufacturing costs are increased particularly by the cost of applying substances to the glass panes by vapour deposition. The glass constructions are rendered even more expensive when they have an hermetically sealed edge for the introduction of noble gases. The hermetically sealed edge gives rise to considerable problems when a high k-value is required in conjunction with a large pane format, since the deflections and movements which have to be absorbed by the edge or by the frame increases as the edge length increases and the temperature difference between the inner and outer panes increases, this temperature difference becoming greater in conformity with a good k-value. Thus, hermetic sealing of the edge not only leads to high costs and frequent cases of damage due to the many mechanical stresses of the edge connection or frame connection during transport, by fluctuations in air pressure, noise, temperature fluctuations and by actuating the windows, that is to say by opening and closing the windows. When using desiccants, saturation of the desiccants occurs very early, frequently shortly after expiry of the guarantee period, so that the interior of the panes can only be kept free from condensate for a relatively short period of time. Thus, it was necessary to arrange the panes at only a relatively short distance apart. Furthermore, hermetic sealing of the edge is also problematical in view of the acoustic coupling of the glass panes, and in view of the heat bridge occasioned by the spacing and sealing means.

If spacers capable of diffusion are used, it has transpired that this solution only functions satisfactorily when the panes are not subjected to direct solar irradiation.

The use of films has hitherto been precluded by the fact, that hitherto, highly transparent films which are adequately resistant to ultraviolet radiation have not been available. Furthermore, it is extremely difficult to introduce the films into the glazing unit parallel to the panes at a reasonable expense.

The inventor of the present invention has conducted exhaustive experiments for the insertion and shrinking-in of films and considers the hitherto proposed methods to be reliable and possible, but too expensive in practice, so that glazing units with films cannot be manufactured economically.

In addition to the changed awareness of the energy problem, the changed conceptions with respect to reasonable nuisance caused by noise also requires improved soundproofing properties in glazing units. Hitherto, there has been no inexpensive solution to the two problems.

A plurality of relatively thick panes only results in satisfactory k-values in soundproofing glazing units, when optimum distances between the panes are observed. This results in relatively heavy and thick glass assemblies which are not only expensive themselves but are also expensive to install. The edge of the glass or the frame has to be reinforced in the case of hermetically sealed spaces between the panes, since the great weight of the panes otherwise does not permit the frame to be sealed hermetically. Thus, the insulating glazing units known hitherto have not lent themselves to the manufacture of large area glazing units without giving rise to an unphysiological room atmosphere which is caused by the low surface temperatures of glazing units of this type and which cannot be eliminated by heating technology.

Therefore, an object of the invention is to provide methods which render it possible to manufacture very satisfactorily thermally insulating and satisfactorily soundproofing glazing units for facades and glazing in a very inexpensive manner, even in the case of diverse and difficult structural and design conditions. A further object of the invention is to provide arrangements having multiple units, such as double and multiple windows, by means of which it is possible to seal the edges hemetically in an inexpensive manner and which can be manufactured in a simple manner, and also enable the panes to be at greater distances apart, wherein the edge connection is to avoid acoustic coupling of the panes and a heat bridge. Moreover, the interior spaces between the panes are to remain free from condensate and dust, and insects can not enter them.

The present invention provides a method of stretching at least one film located between panes, in which a frame is formed from at least two frame portions. The mutually confronting surfaces of the frame portions are profiled, and the film is secured to one individual frame portion. The individual frame portions are assembled to form the full frame, and upon the pressing-together of the frame portions, the film is stretched by the confronting profiled surface on the frame portion adjacent the one frame portion.

Thus, it is possible to manufacture, in an inexpensive and reliable manner, glazing units having relatively smaller distances between the panes, irrespective of the existing installation conditions. Highly transparent films or, alternatively, films provided with a coating which reflects in the infrared range, can be inserted, one between two adjacent panes or several parallel to one another by securing the films to a respective frame portion, and then stretching the films by pressing the profiled surface on the mating frame portion thereagainst.

If required, intermediate panes, which absorb the tensile forces of the films, can be additionally used for support purposes. The frame portions, which form a spacer or spacing and sealing means have to be pressed together in order to tension the films. This is effected by first bringing the frame portions close together by a press and then interconnecting them in this position. Differing profiling of the frame portions results in a desired differing initial stress, so that differing resonances are thus produced. The spacer can abut against the edge of the glass and form a protection for the edge. Alternatively, a strip, such as is normally used as protection for the edge of insulating glazing units, can be used which holds the glass panes in this state. This results in a compact insulating glazing unit which can be fitted in a rabbet in an outer frame and sealed thereto in a conventional manner.

Thus, the method in accordance with the invention results in an advantageous insertion facility in which the films are arranged between the panes in a flat and parallel manner. A wide variety of window formats can be manufactured by the method in accordance with the invention without expensive apparatus and with low labor costs.

The invention includes a multiple glazing unit comprising at least two panes, a spacer supporting the panes in spaced parallel relationship and comprising at least two frame portions, mutually confronting profiled surfaces on the frame portions, and at least one film which is secured to a respective one of the frame portions so as to extend between and substantially parallel to the panes and which is stretched under the action of the confronting profiled surface on the adjoining frame portion when assembling and pressing together the frame portions.

If the films have a coating which is reflective in the infrared range, it is advantageous for the coating to be sufficiently thin to avoid discernable discolouration as might be effected by ultra-violet radiation.

The structural dimensions can be optionally chosen in accordance with the criteria with respect to sound and heat technology, and in accordance with the economic and design criteria.

When the multiple glazing unit is held in place in a suitable opening, e.g. in an outer frame, by means of a glazing strip of conventional width, as is the case, for example, of measures for the protection of monuments, a narrow edge construction can be chosen which is either hermetically sealed, or is constructed with a desiccant. A particularly inexpensive solution resides in constructing the spacer, which is constituted by at least some of the frame portions, so as to be permeable to vapour. This is possible if the glazing strip is well ventilated, such as is necessary in the case of back-ventilated facades and cold rooves. Advantageously, only that portion of the glazing strip which faces the interior of the building is filled with an insulating material capable of diffusing vapour, and the outer portion is ventilated. Thus, the accumulation of condensate is avoided over a long period of time. Thus, upon a fall in outside temperature, the quantity of condensate is only of the order of magnitude of a milligram. A silicone coating on the inner surface of the glass panes and/or on the film or films, prevents the condensate from being precipitated on the transparent surfaces. A low surface temperature of the frame in the same air chamber causes the condensate to be precipitated on the frame and not on the transparent surfaces. A material having a large active surface in the spacer can bind this quantity of moisture until steady temperature conditions prevail again. This function can be jointly undertaken by a material which dissipates sound energy, and which is fitted to improve the soundproofing qualities.

In order to reduce the conduction of sound by the spacer, at least some of the frame portions, can be resiliently attached to the glass panes. For the same purpose, the window construction or facade construction which presses the glass together can transmit its forces resiliently. The resilient connection thus produced can also compensate for the differential movements of the panes and the facade.

As already mentioned previously, differing suitable tensioning of the individual film or films can be effected by appropriate shaping of the profiled surfaces differing natural resonances being imparted to the film or films in this manner, so that noise surges do not occur at resonant frequencies in the case of air sound-proofing.

When reglazing, the glass can be secured by clips or tongues mounted on the spacer. The frame portions can be assembled from prefabricated profiled bar sections or, alternatively, they can be subsequently profiled. Furthermore, it is possible, in an advantageous manner to use prefabricated profiled bar sections and prefabricated corner pieces which are assembled to form the frame portions. It is particularly advantageous to manufacture a kind of sash or frame according to the format of the panes, and to construct the individual frames therefrom.

According to the installation conditions, it can be advantageous for the edges of the panes to project beyond the spacer, to terminate them with the spacer, to border them with the spacer or for the panes to project individually or to differing widths beyond the edge of the spacer.

The above-mentioned preferred features of the invention permit the manufacture of inexpensive insulating and glazing units with inserted films, a technically and economically advantageous solution resulting from the very good heat insulating properties with the use of films which are reflective in the infrared range. Owing to the simple design, the spacer construction allows great variability and thus adaptability to differing applications, so that this also renders it possible to obtain economic glazing.

There is no need to provide the panes with very expensive coatings which are reflective in the infrared range, and, furthermore, several films can be inserted in an inexpensive manner, so that it is possible to dispense with a gas filling and a hermetically sealed edge construction. By way of example, a small k-value of 0.6 (Kcal/$m^2$h degrees) was measured in the case of an insulating glazing unit sample, constructed in accordance with the invention, having two films and without a gas filling, 4 mm window glass being used. The very inexpensive insertion of the films also rendered it possible to use several films having very thin coatings which are reflective in the infrared range, so that the energy absorption of the films is very low. Thus, it is possible to obtain a neutrally coloured transparency, without impairing the k-values.

In accordance with a particularly advantageous development of and/or modification to the invention, air filters are provided which are arranged between the outer pane and the inner pane in glazing units without films, and between the outer pane and the first film in the case of glazing units having at least one film. The air spaces between the outer pane and the inner pane, or between the outer pane and the outermost film are ventilated by means of these air filters. Advantageously, the air filters should be arranged in the horizontal portions of the frames, and should be impregnated to render them water-repellent and to enable them to trap dust. Spun glass fabrics, through which insects cannot penetrate into the interior space of the window, is a very advantageous material for the air filters.

In accordance with a further advantageous development of the invention, in which the spacer formed by at least some of the frame portions is moisture permeable, the glazing unit is held by a ventilated surrounding frame portion which protects the spacer, the air filters and the thermal insulation and renders it possible to install the multiple glazing unit irrespective to the thickness of the casement and to provide it with an adequately ventilated glazing strip.

The ventilation openings in the ventilated glazing strip are disposed such that the ingress of moisture of condensation is largely prevented and any water which penetrates can flow away directly.

The flow of air through the air space behind the outermost pane takes place primarily during exposure of the pane to direct sunlight since the coating reflective in the infrared range is heated to a considerable extent owing to the absorption of light, and a considerable amount to lift occurs which overcomes the high flow resistance in the air filters and in the narrow openings which are required for acoustic reasons. For acoustic reasons, the interior of the spacer and the interior of the ventilation profiled sections can be lined with a sound-absorbing material.

The surfaces of the films facing the outside can be provided with a metal coating which protects the films against ultraviolet radiation.

A desiccant is not required in the embodiment of the multiple glazing unit having air filters, so that no problems arise on guarantee expiry. Furthermore, it is unnecessary to provide a hermetic edge seal, so that, here also, no difficulties arise with respect to the guarantee, and a rigid connection with its inherent disadvantages is not required. In this manner, it is possible to provide a wider, lighter spacer which, in the case of a coating which reflects in the infrared range, and without a special gas filling, results in a k-value which exceeds that of modern insulating glasses. Thus satisfactory soundproofing values are obtained even with relatively thin panes.

Figure 2:
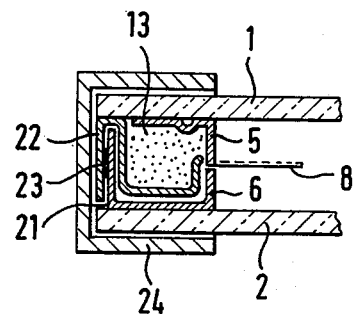
Figure 5:
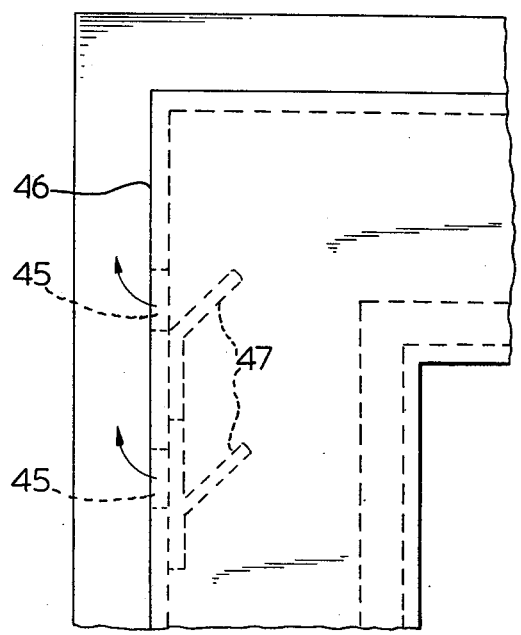
Figure 3:
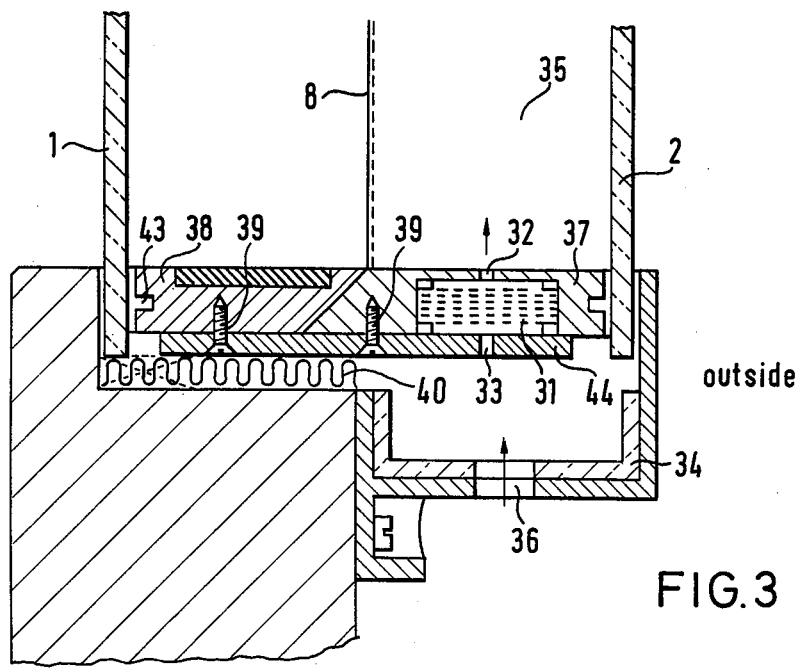
Figure 4:
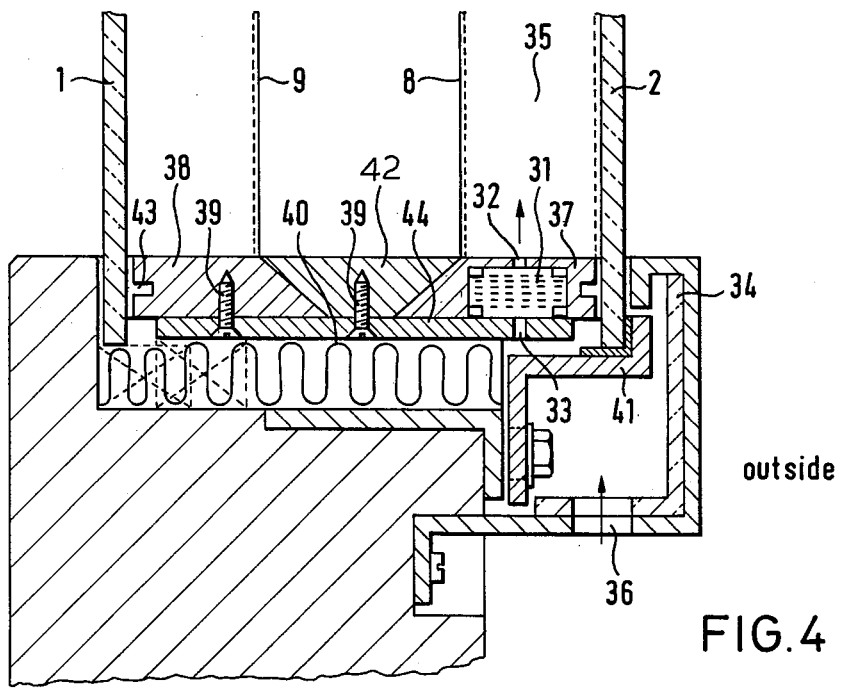

The invention is hereafter further described by way of example, with reference to the drawings, in which:

FIG. 1 is a fragmentary sectional view of an embodiment of an air filled double-glazing unit, in accordance with the invention, having two films which are reflective in the infrared range and having a vapour-barrier, a desiccant and enhanced soundproofing, the spacer being acoustically decoupled and not constituting a heat bridge, FIG. 2 is a similar view of an embodiment of a gas-filled double-glazing unit having an infrared-reflective film, a vapour barrier, a desiccant, and small installation dimensions, FIG. 3 is a cross section through the bottom edge of another embodiment of a glazing unit, and air filter being provided in the said edge, FIG. 4 is a fragmentary cross section through a further embodiment of the bottom edge of a glazing unit and, FIG. 5 is an elevation of a side edge seal having a ventilation opening.

In the embodiment of double-glazing unit illustrated in FIG. 1, two glass panes 1, 2 are attached respectively to two outer frame portions 5,6 by way of resilient connection members 3 and 4. The resilient connection members 3 and 4. The resilient connection members 3 and 4 enable the panes 1 and 2 to be attached to the frame in a soundproofing manner, and also permit movement of the panes 1 and 2 relative to the frame, thus prevent fracturing in the case of mechanical stress and in the case of differing thermal expansion of the frame portions and of the panes. The outer frame portions 5 and 6 and an intermediate frame portion 7 form a spacer which holds the panes 1 and 2 in spaced parallel relationship. Films 8,9 are glued to the respective outer frame portion 5,6 but in an alternative construction could be glued to the intermediate frame portion 7.

The mutually confronting surfaces of the frame portions 5,6,7 are profiled such that they fit into one another. The frame portions 5,6,7 are made from profiled bar sections in conformity with the size of the glass panes 1 and 2 and the lengths of the bar section can be secured together by prefabricated corner pieces (not shown). The frame portions 5,6,7 are interconnected by a plate 10 and screws 11. The profiled surfaces of the frame portions 5,6,7 are pressed against one another with the border regions of the films 8 and 9 sandwiched therebetween so that the screws 11 are tightened so that the films 8,9 are stretched. The profiled surfaces of the frame portions 5,6,7 can be variously designed in a suitable manner to obtain differing film tensions and thus differing resonance frequencies of the films 8,9. If required, the interiors of the frame portions 5,6,7 can contain materials 12 which render possible further sound-proofing and thermal insulation of the individual frame portions and thus of the entire frame. Desiccants can be provided on the inner surface of the frame portions 5,6,7 or the said frame portions can be provided with a silicone coating. An infrared-reflective coating is indicated on the films 8,9.

Importance has been attached to small installation dimensions in the embodiment illustrated in FIG. 2, in which the space between the panes 1 and 2 is filled with a gas which is denser than air in order to provide enhanced heat insulation. Here a single film 8 is inserted between two frame portions 5,6 whose mutually confronting surfaces are profiled so as to stretch the film. The sides of the frame portions 5,6 which are remote from the gas space are provided with surfaces 21,22 which are located parallel to one another and which are interconnected by a sealing material 23, so that the interior space between the panes 1 and 2 is sealed in an airtight manner. In this embodiment also, at least one of the frame portions 5 and 6 is provided with a desiccant 13. Another frame 24 is provided around the edges of the panes 1 and 2 and the outer edge of the frame.

The spacers 5,6,7 of FIG. 1 and 5,6 of FIG. 2 also constitute sealing means to prevent ingress of moisture into the space between the panes 1 and 2. The interior spaces of the embodiments of FIGS. 3 and 4 on the other hand, are ventilated.

Identical parts in FIGS. 3 and 4 are provided with the same reference numerals. The parts already described with reference to FIGS. 1 and 2 will not be described again in the case of FIGS. 3 and 4. FIG. 3 shows a single film 8 stretched between frame portions 37 and 38 and FIG. 4 shows two films 8 and 9 stretched between frame portions 37 and 38 and an intermediate frame portion 42.

The air space 35, located between the film 8 and the outer pane 2, communicates with the interior space of a profiled glazing strip 34 by way of an opening 32, an opening 33 and a sound-absorbent air filter 31 in the frame portion 37, the interior space of the glazing strip 34 in turn communicating with the outside atmosphere by way of a further opening 36. The filter 31 is made of spun-glass fabric and is impregnated to render it water-repellent and to enable it to act as a dust trap. It is designed so as to permit the passage of only a small quantity of air and so as to transmit only a small amount of noise.

The glazing strip 34 is lined in the sound-absorbent material.

The double-glazing unit is fitted into a window casement of, for example, 58 mm thickness. The inner pane 1 is laid against the base of a rabbet in an outer frame and the remaining width of the rabbet, i.e. the gap between the edge of the unit and the wall of the rabbet, is filled with a material 40 for thermal insulation purposes although admitting diffusion, a glued joint 43 between the inner pane and frame being substantially more moisture-proof than the filling material 40 which extends approximately to the centre of the thickness of the double-glazing unit (FIG. 3) or to the plane of the room side of the outer air layer, i.e. the plane of the outer film 8 (FIG. 4). The air flow in the profiled glazing strip 34 flows around the outer portion of the double-glazing unit, the profiled glazing strip being open at the bottom by way of the opening 36. In the case of wooden windows, the region of the abutment of the unit against the rabbet bottom and of the thermal insulation needs only to be treated with a ventilation base in order to enable moisture exchange to take place between the air and the wood. The spacer constituted by the frame portions 37,38 or 37,38,42 is thus able to absorb and give off small quantities of condensate. A plate 44 interconnects the two frame portions 37,38 and, in FIG. 4, the intermediate frame portion 42 by, for example, screws 39 and absorbs the force which tensions the film or films.

The outer portion of the spacer 37,38 or 37,38,42 is so constructed that it satisfactorily conducts or dissipates heat. A material having a large active surface or a large capillary absorption capacity can be provided on the inside of the spacer.

The embodiment illustrated in FIG. 4 corresponds to the embodiment illustrated in FIG. 3, although measures are provided which take into account a thicker frame. Larger, heavier panes can be supported by the additional fitting of profiled sections 41.

FIG. 5 is a plan view of a side edge closure having ventilation openings 45 in the glazing strip 46. The ventilation openings 45 are protected by interior deflectors 47 to prevent ingress of rainwater. The openings 45 serve the same function as the openings 36 in FIGS. 3 and 4.

The films 8 and 9 can be correctly adhered to the frame portions 5 and 6 or 37 and 38 by putting adhesive on the frame portions and laying the film over the frame portions in contact with the adhesive. A temporary outer frame (not shown) can be used to hold the film in place while it is adjusted in position before the adhesive sets and until the adhesive has set.

The frame portions 5,6,7 or 5,6 or 37,38 or 37,38,40 mutually support one another and also transfer the stress forces, arising due to the film tension, to the edges of the panes 1,2.

A further film can be applied, by means of an adhesive which does not transmit ultraviolet radiation, to the inside surface of the outer pane 2 facing the outermost film 8.

In the case wherein several films are employed at least one intermediate pane (not shown) can be provided between the films in order to take up the stresses arising due to the tension in the stretched films, thus providing a triple-glazing unit.

We claim:

1. A method of stretching at least one film located between two panes of a glazing unit comprising the steps of:
   (a) providing at least two frame portions to form a full frame;
   (b) providing the frame portions with mutually confronting profiled surfaces;

(c) securing a film to one of the frame portions;

(d) assembling the individual frame portions to form the full frame, and (e) pressing-together the frame portions to stretch the film by the coaction of the confronting profiled surface of the second frame portion against the confronting profiled surface of the one frame portion.

2. A method as claimed in claim 1, comprising the further steps of:

(f) securing the film to the one frame portion by adhesive means;

(g) slipping a peripheral frame onto the one frame portion to hold the film in position before the adhesive sets, and (h) holding the film in an appropriate position until the adhesive sets.

3. A method as claimed in claim 1 in which the profiled surfaces are so formed as to predetermine the initial stress of the inserted film and thus to predetermine the resonance of the film.

4. A method as claimed in claim 1 further comprising securing a second film to a respective frame portion and providing a further frame between said films to at least partially absorb the forces derived from the film tension.

5. A method as claimed in claim 1 in which the frame portions are each constructed as frames in accordance with the size of the panes.

6. A method as claimed in claim 1 in which the frame portions are constructed from prefabricated profiled bar sections.

7. A multiple glazing unit comprising (a) at least two panes;

(b) a frame having at least two frame portions;

(c) mutually confronting profiled surfaces on the frame portions, and (d) at least one film which is secured to one of said frame portions so as to extend between and be substantially parallel to the panes, and said film stretched between the frame portions upon the pulling action of the confronting profiled surfaces on the film when assembling and pressing together the frame portions.

8. A multiple glazing unit as claimed in claim 7, in which the films have a coating which is reflective in the infrared range and said coating being sufficiently thin to protect against ultraviolet light discoloration.

9. A multiple glazing unit as claimed in claim 7 in which the inner surfaces of the panes and the surfaces of the films are provided with a thin silicone coating.

10. A multiple glazing unit as claimed in claim 7 in which at least some of the frame portions constitute spacing and sealing means between the outer panes to hermetically seal the interior space between the panes.

11. A multiple glazing unit as claimed in claim 7 in which the interior space between the panes, and/or between the panes and the films, is filled with a gas adapted for improving thermal insulation.

12. A multiple glazing unit as claimed in claim 7 in which at least some of the frame portions constitute a spacer which is constructed to suppress vapour by providing a desiccant in the interior space thereof.

13. A multiple glazing unit as claimed in claim 7 in which at least some of the frame portions constitute a spacer having an opening therein to diffuse vapour.

14. A multiple glazing unit as claimed in claim 7 in which at least some of the frame portions constitute a spacer to which a soundproofing material is applied.

15. A multiple glazing unit as claimed in claim 7 in which the frame portions are constructed such that they mutually support one another and transmit the stress forces of the films to the edges of the panes.

16. A multiple glazing unit as claimed in claim 7 in which a film is applied, by means of an adhesive which does not substantially transmit ultraviolet radiation, to the inside of that pane which, viewed from the outside, is situated in front of the outermost film.

17. A multiple glazing unit according to claim 7 wherein the profiled surfaces of said frame portions are matingly angled with respect to each other.

18. A multiple glazing unit as claimed in claim 7 in which the frame portions are made from a material which readily absorbs and gives off small quantities of condensate.

19. A multiple glazing unit as claimed in claim 18 in which the inside of the glazing strip is lined with sound-absorbent material.

20. A multiple glazing unit as claimed in claim 7 in which a ventilated glazing strip is provided for ventilating at least a portion of the space between the panes.

21. A multiple glazing unit as claimed in claim 20 in which at least some of the frame portions constitute a spacer whose outer portion satisfactorily conducts and/or dissipates heat.

22. A multiple glazing unit as claimed in claim 20 in which a material having a large active surface or a large capillary absorption capacity is provided on the inside of the spacer.

23. A multiple glazing unit as claimed in claim 7 further comprising an air filter disposed in said frame and by which the space between the outer pane and the adjacent film is ventilated.

24. A multiple glazing unit as claimed in claim 23 in which the air filter is impregnated to render it water-repellent and to enable it to trap dust.

25. A multiple glazing unit as claimed in claim 23 in which the air filter is constructed of a spun glass fabric.

26. A multiple glazing unit as claimed in claim 23 in which the air filter permits the passage of only a small quantity of air and the transmission of only a small amount of sound.

* * * * *

UNITED STATES PATENT AND TRADEMARK OFFICE
CERTIFICATE OF CORRECTION

PATENT NO. : 4,242,386
DATED : December 30, 1980
INVENTOR(S) : Tilman L. Weinlich It is certified that error appears in the above-identified patent and that said Letters Patent are hereby corrected as shown below:

Column 2, line 9, "reduced" should read -- rendered --.

Column 5, line 66, "to" should read -- of --.

Column 6, line 10, "to" should read -- of --.

Column 6, line 56, "The resilient connection" should be deleted.

Column 6, line 57, "members 3 and 4." should be deleted.

Signed and Sealed this

Fifth Day of May 1981

[SEAL]

Attest:

RENE D. TEGTMEYER

Attesting Officer Acting Commissioner of Patents and Trademarks